United States Patent
Karipides et al.

(10) Patent No.: US 7,359,935 B1
(45) Date of Patent: Apr. 15, 2008

(54) GENERATING CONTEXTUAL USER NETWORK SESSION HISTORY IN A DYNAMIC CONTENT ENVIRONMENT

(75) Inventors: Daniel Paul Karipides, Round Rock, TX (US); Susumu Harada, Stanford, CA (US)

(73) Assignee: Versata Development Group, Inc., Austin, TX (US)

( * ) Notice: Subject to any disclaimer, the term of this patent is extended or adjusted under 35 U.S.C. 154(b) by 664 days.

(21) Appl. No.: 10/324,764

(22) Filed: Dec. 20, 2002

(51) Int. Cl.
    *G96F 15/16* (2006.01)
(52) U.S. Cl. .............................. 709/203; 705/10; 707/6
(58) Field of Classification Search ...................... None
    See application file for complete search history.

(56) References Cited

U.S. PATENT DOCUMENTS

| | | | |
|---|---|---|---|
| 6,195,679 B1 * | 2/2001 | Bauersfeld et al. ......... 709/203 |
| 6,286,098 B1 * | 9/2001 | Wenig et al. ............... 713/151 |
| 6,792,605 B1 * | 9/2004 | Roberts et al. ............. 719/313 |
| 6,839,680 B1 * | 1/2005 | Liu et al. .................... 705/10 |
| 6,853,982 B2 * | 2/2005 | Smith et al. ................. 705/27 |
| 6,912,505 B2 * | 6/2005 | Linden et al. ............... 705/14 |
| 6,934,912 B2 * | 8/2005 | Simpson et al. ............ 715/745 |
| 6,957,390 B2 * | 10/2005 | Tamir et al. ................. 715/744 |
| 6,970,933 B1 * | 11/2005 | Masters ...................... 709/229 |
| 7,039,668 B2 * | 5/2006 | Miyamoto ................... 709/201 |
| 7,134,137 B2 * | 11/2006 | Joshi et al. ..................... 726/1 |
| 7,152,018 B2 * | 12/2006 | Wicks ........................ 702/186 |

* cited by examiner

*Primary Examiner*—Bunjob Jaroenchonwanit
*Assistant Examiner*—Van Nguyen
(74) *Attorney, Agent, or Firm*—Hamilton & Terrile, LLP; Kent B. Chambers

(57) ABSTRACT

A network session recording and parsing system ("SRP System") captures direct user interactions passed between the web server and a browser, the SRP System and information from the web site's server-side application layers. In one embodiment, the SRP System includes two main components, data recording hooks and a parser. The SRP System includes a data recording hooks library that provides the ability to implement a dynamic, web-based application and gather a wide-range of user session history information. The SRP System parser analyzes the logged information from the data recording hooks and re-creates a history, with a desired level of contextual detail, of every individual user's session. In one embodiment, the SRP System embodies a flexible design system that allows a designer to customize the type of information recorded. An embodiment of the data recording hooks provides a virtually unnoticeable impact to browser-Web server request and response times.

45 Claims, 12 Drawing Sheets

| Session ID | Record Candidate Status | Parsing Success |
|---|---|---|
| | (0-Ready; 1-Working with Parser; 2-Finished Parsing) | (0-Success; 1-Error Code) |

US 7,359,935 B1

GENERATING CONTEXTUAL USER NETWORK SESSION HISTORY IN A DYNAMIC CONTENT ENVIRONMENT

BACKGROUND OF THE INVENTION

1. Field of the Invention

The present invention relates in general to the field of information processing, and more specifically to generating contextual user network session history in a dynamic content environment using a session recording and parsing system.

2. Description of the Related Art

The use of networks, particularly the Internet, by users continues to rise as technology and interesting destinations increase. World wide web ("Web") sites continue to play an increasing role in the business models of many businesses. Sophisticated Web sites, such as many configuration Web sites, present a large number of navigation path options to a user, and, thus, a large amount of information about the user's and information presented to the user is potentially available for collection and analysis.

Historical information surrounding a user's Web site session can be very valuable information, particularly when attempting to understand the context of a user's Web session. However, reliably capturing this knowledge and recording it in a useful and accessible format has proven elusive for conventional technology.

FIGS. 1 and 2 depict two Web systems and conventional attempts to capture session information. FIG. 1 depicts a static Web system 100. Web system 100 represents one of the original concepts for Web system and function. The Web site 108 includes a network of static hypertext markup language ("HTML") pages 102(a)-102(d) linked together via hyperlinks. During a user's Web session, i.e. the user's activity on a Web site during a fixed time-frame, browsers 104(a)-104(c) interact with the Internet information services ("IIS") Web server 106 over a network, such as the Internet or an intranet, to access static content. Note, Internet Explorer browsers and IIS Web server software are available from Microsoft Corporation of Washington and Netscape Navigator browsers are available from Netscape Communication Corporation. Such interaction works as follows. Each individual browser 104(a)-104(c) makes requests of specific, static HTML pages selected from HTML pages 102(a)-102(d). The Web server 106 receives these requests, locates the corresponding HTML page and sends back that HTML page to the requesting browser as a response. In essence, the Web server 106 functions as a warehouse for HTML pages 102(a)-102(d), with the ability to handle multiple requests for multiple pages at the same time.

The content of the HTML pages 102(a)-102(d) is not dynamic, i.e. the content of any page does not change from response to response. Hyperlinks on a particular page request other static pages when clicked on by the user, allowing the user to navigate the Web site 108.

IIS Web server 106 log records capture the request information from browsers 104(a)-104(c). However, the content of the responses is not logged. Generally this is unnecessary as the content does not change from response to response, so recording this information would not add useful information into the log files.

Thus, by recording each page accessed by a particular browser, a user's session could be recreated entirely, provided that an archival record is made of the content of each accessed page. For web sites, such as an automotive or computer configuration web site, creating the number of pages necessary to represent all possible configurations would require an enormous amount of memory. Additionally, any modifications to configuration options would typically require an enormous of amount of work to update or replace old pages.

FIG. 2 depicts a dynamic content generating Web system 200, which essentially makes interactive applications (such as a configurator, or a online retail site) available via the Web. Dynamic content allows a Web page to display current products in a user's shopping cart and display a different list depending on what items the user is considering for purchase. Similarly, for an auto configuration site, the available colors displayed on an exterior colors Web page depend on all the other choices the user has made before viewing the colors page.

Dynamic Web site 204 stores a minimal amount of static HTML pages. The vast majority of Web pages are generated using a much smaller number of dynamic content pages 210, such as Java Server Pages™ ("JSP"). JSP is an alternative Java™ based format engineered to manage dynamic content on the Web. Many versions of JSP supports the development of reusable modules often referred to as "actions" or "functions". A tag in the JSP page invokes a referenced tag function. ("Java Server Pages" and "Java" are trademarks of Sun Microsystems of Santa Clara, Calif.) When a request for one of the Dynamic content pages 210 arrives from any of browsers 206(a)-206(c), the Web server 202 forwards the request to the servlet runner application 208, such as "JRun" by Macromedia, Inc. of San Francisco, Calif. Servlet runner application 208 interprets the code on the requested JSP page along with a number of variables stored for each active user. The variables typically include data such as lists of items in a shopping cart and the parts chosen in an active configuration. Using the requested JSP page and the variables, the servlet runner application 208 generates an HTML page 212. Clearly the content of this html file is dynamic, changing with every request for the JSP page in question. The servlet runner application 208 passes the HTML page 212 to the IIS Web server 202. The IIS Web server 202 returns the HTML page 212 to the requesting browser. The content of this HTML page 212 is dynamic, changing with every browser request for a particular one of the JSP pages 212.

Note that from the perspective of the IIS Web server 202, for purposes of this discussion there is virtually no difference between a browser request for an HTML page and a JSP page. In both cases the response to a request is an HTML page. The IIS Web server 202 logs still only record the requests made to the IIS Web Server 202. The logs do not contain any information about the content of the responses. For example, in a server-side configuration or pricing application may generate data used to populate the HTML page 212. This server-side generated data provides values for many of the variables that are not recorded in the IIS Web Server 202 logs. In the case of static HTML pages 102(a)-102(d), this was not an issue because of the persistence of every HTML page. In the case of dynamic pages, much of the information contained in HTML page 212 is not recorded in the logs. Such information includes many of the details that are desirable to track such as configuration selection details, dealer search details, vehicle locate details, customer demographics, etc. For example, using browser 206(a), a user selects an exterior color on an automotive configuration Web site. While the IIS Web server 2002 log may reveal that a vehicle was configured, or that a particular exterior color was selected, the log would not indicate that the choice of exterior color also resulted in a change of interior color because this information is not included in the server response to the browser. Similarly, consider the case of a lead sent to a dealer. While the IIS log would indicate a request for the lead submission page, it would contain no information about the details of the lead because this information is not communicated to the browser.

SUMMARY OF THE INVENTION

In one embodiment of the present invention, a method of recording and parsing a network user session includes receiving one or more requests from a client-side application for data during the network user session and processing each request using one or more server-side applications. The method further includes capturing session information included in each request and capturing session information generated during the processing of each request by each of the server-side applications. The method further includes generating a set of records from the session information for the network user session and responding to each of the requests and parsing the set of records to generate a history of the network user session.

In another embodiment of the present invention, a computer program product comprises instructions executable by an information handling system. The instructions are for receiving one or more requests from a client-side application for data during the network user session and processing each request using one or more server-side applications. The method further includes capturing session information included in each request and capturing session information generated during the processing of each request by each of the server-side applications. The method further includes generating a set of records from the session information for the network user session and responding to each of the requests and parsing the set of records to generate a history of the network user session.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

As stated above, historical information surrounding a user's Web site session can be very valuable information. A Web system described herein includes a session recording and parsing system ("SRP System") and process that can capture a much wider range of a user's session information on a network than conventional technology. For example, dynamic Web site applications include many different layers, such as the Web server, dynamic content pages, and server applications. Embodiments of the SRP System can not only capture direct user interactions passed between the web server and a browser, the SRP System can also capture information from the Web site's server-side application layers. In one embodiment, the SRP System includes two main components, data recording hooks and a parser. The SRP System includes a data recording hooks library that provides the ability to implement a dynamic, web-based application and gather a wide-range of information about user's session activity. The SRP System parser analyzes the logged information from the data recording hooks and re-creates a history, with a desired level of contextual detail, of every individual user's session. In one embodiment, the SRP System embodies a flexible design system that allows a designer to customize the type of information recorded so as to re-create the desired granularity of history. Additionally, an embodiment of the data recording hooks provides a virtually unnoticeable impact to browser-Web server request and response times.

Figure 1:
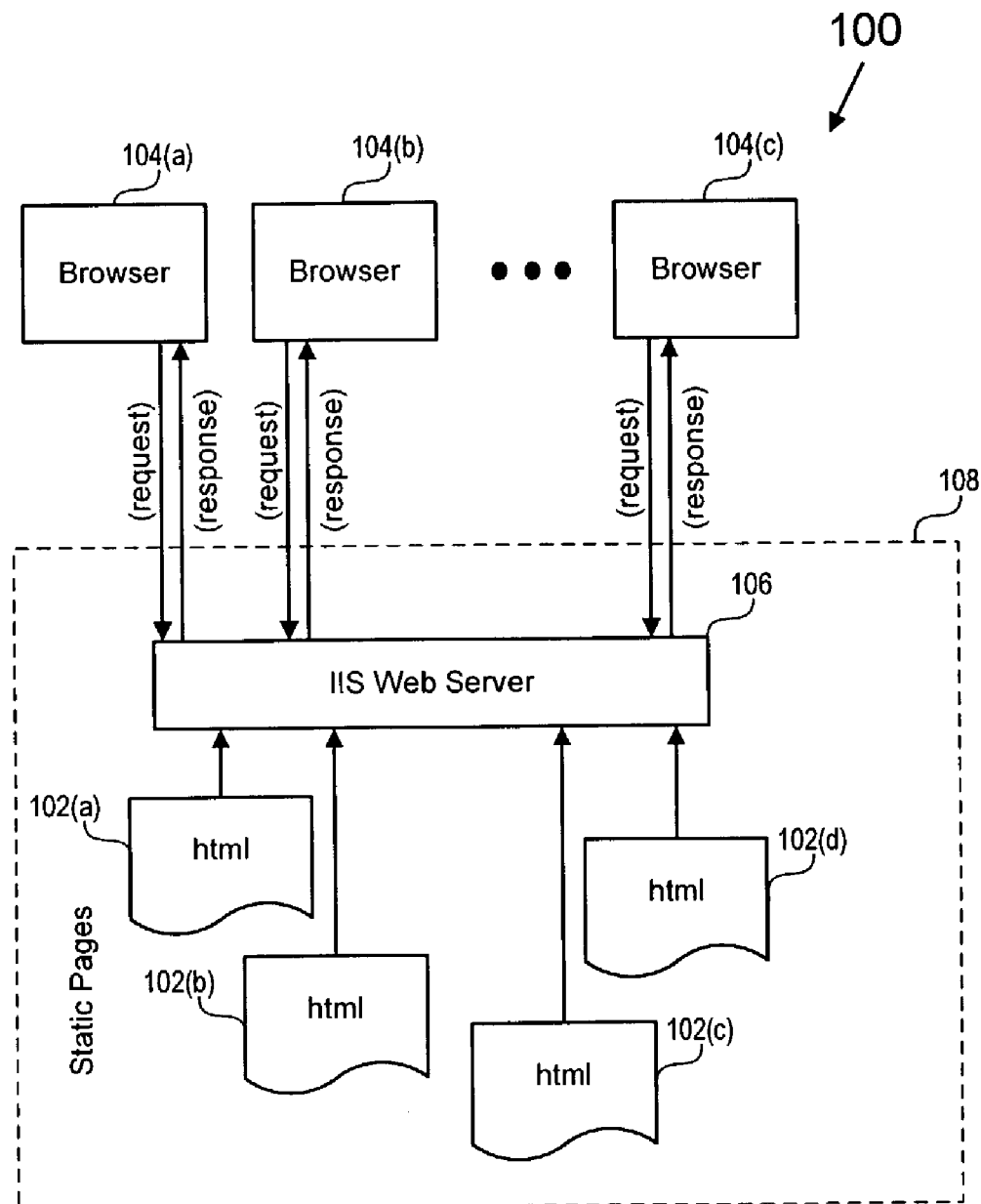
FIG. 1 depicts a prior art static Web system.
Figure 2:
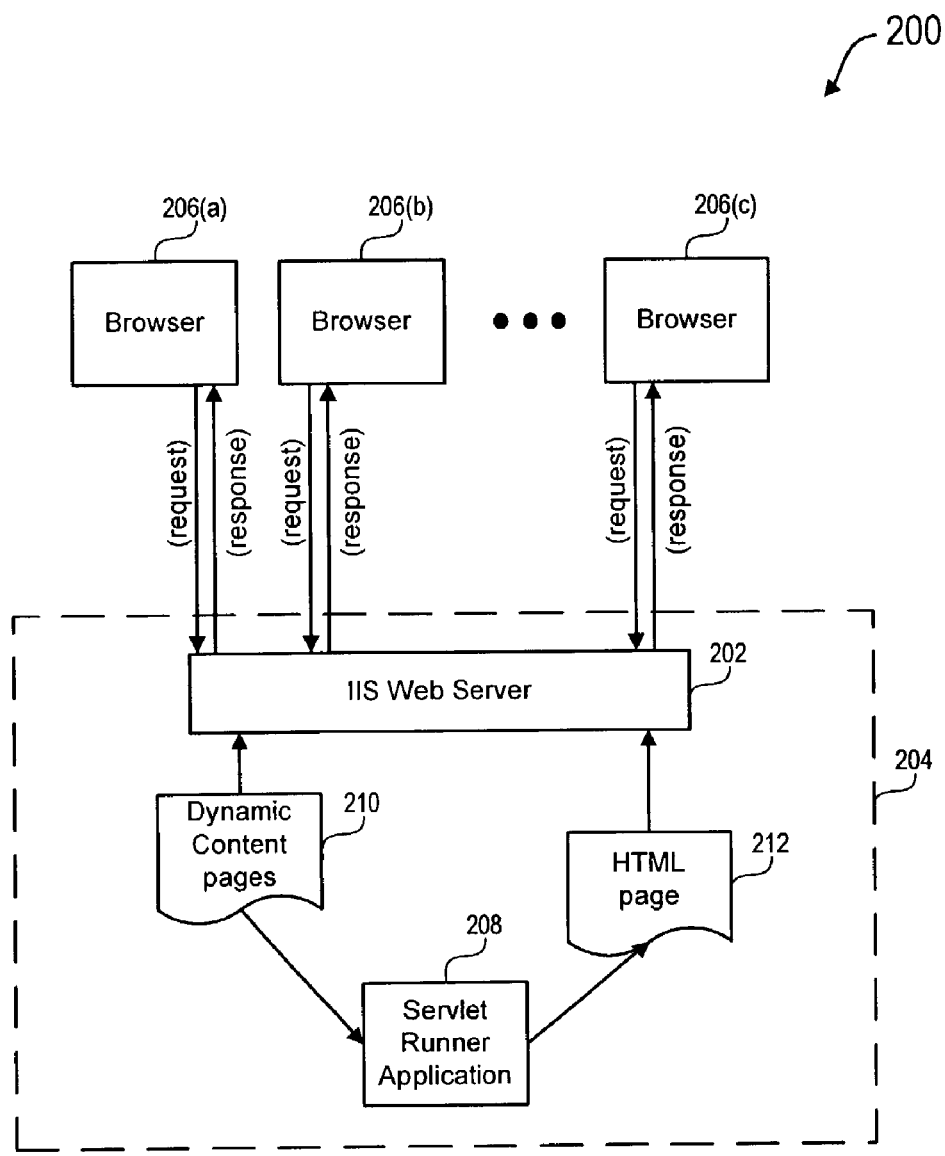
FIG. 2 depicts a prior art dynamic Web system.
Figure 3:
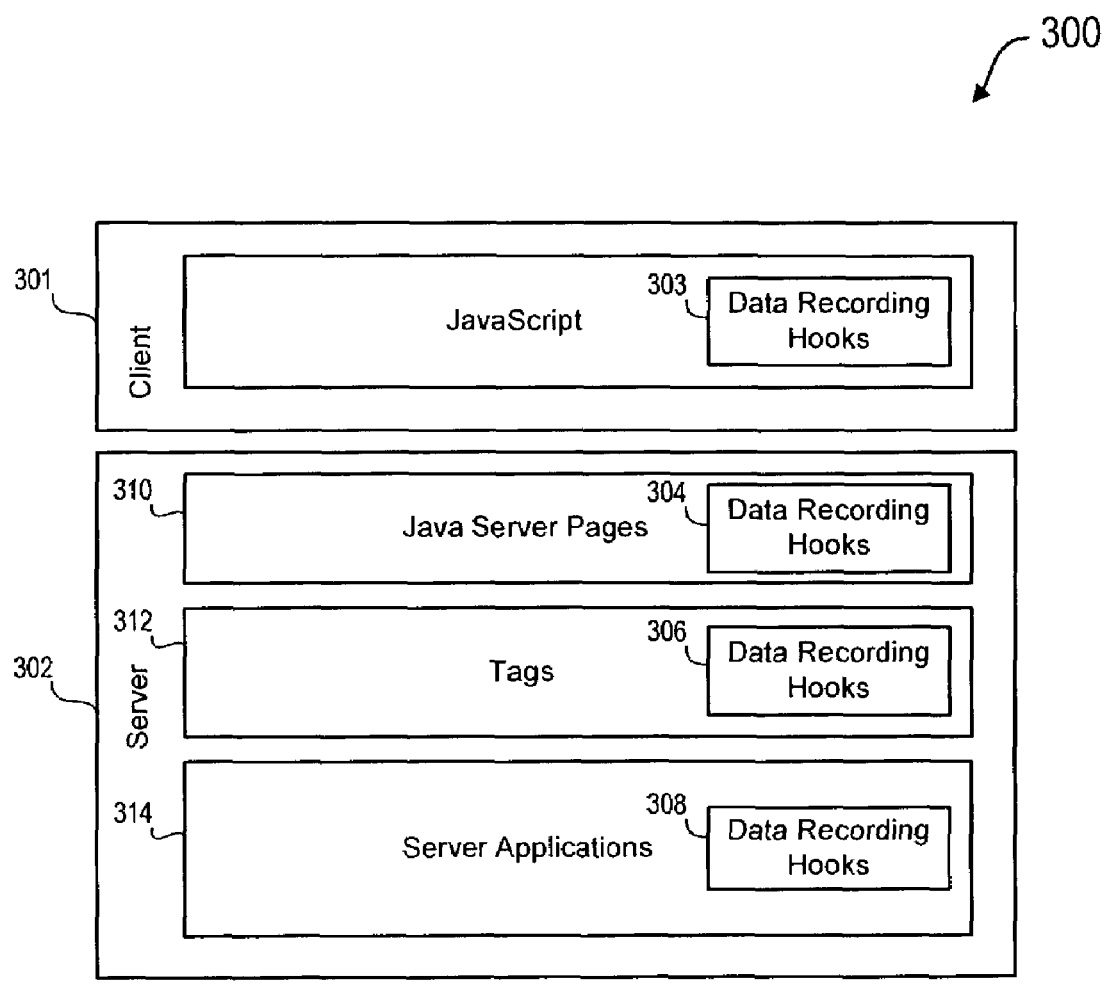
FIG. 3 depicts a client-side and server-side software having data gathering hooks.

FIG. 3 depicts one embodiment of client-side and server-side software layers 300 in a Web system. Client-side applications 301 include a JavaScript layer, which allows executable content to be included in Web pages. Thus, a Web page can include programs that, for example, interact with the user, control the browser, and dynamically create HTML content. On the client-side, data recording hooks 303 capture information that is created by user interaction with a browser. Server-side applications 302, data recording hooks 304, 306, and 308 are included in the JSP layer 310, JSP tags layer 312, and server application layer 314. The server application layer 314 includes applications such as a configuration application by Trilogy Software, Inc. of Austin, Tex. The JSP data recording hooks 302 record information that is generated as part of a JSP page 310. The data recording hooks 306 record information that is generated by a tag function. Similarly, the data recording hooks 308 record information that is generated by a server application. The server-side applications 302 and client-side applications 301 are designed to label specific data with labels associated with Record Types. The data recording hooks are designed to recognize such labels, thus allowing the data recording hooks to capture the desired data. It will be apparent to those of ordinary skill in the art that data recording hooks can be included as part of any application that can create and label data.

Data recording hooks 302, 306, and 308 capture and record session related data. The amount and type of session related data captured and recorded is a design choice and depends on the type of Web site and the information that will adequately provide the desired information, such as information for determining the context for a user's session. In one embodiment, data that will provide the desired user session history is divided into discrete record types. Record types may be further defined by subrecords, and so forth. In one embodiment, client-side data recording hooks are not necessary to determine the context of a user's session. Table 1 sets forth example server-side record types and associated subrecords for a configuration related Web site. Table 1 includes descriptions of the record types and subrecords when the associated name is not self-explanatory.

TABLE 1

| No. | Record Type | Subrecords | Record Type and Subrecords Description |
|---|---|---|---|
| 1 | Active Configuration | | Recorded every time a new product is loaded in the configurator |
| | | year | |
| | | model | |
| 2 | Configuration Detail | | Represents part of a complete configuration; one record per user selected, included or completed part in the configuration engine |
| | | group | Part class of the part represented by the configuration detail |
| | | description | Displayed description of the part represented by the configuration detail |
| 3 | Dealer | | Recorded for every selection of a distinct dealer |
| | | classification | Can be used to group dealers; supports any arbitrary grouping |
| 4 | External Integration | | Records interaction of the web application with external integration points, such as locate and lead systems |
| | | integration | Identifies the type of integration point (lead, locate) |
| | | correlationID | An identifier that can be used to distinguish the interaction to the integration application |
| 5 | Incentive | | Records active incentives on a chosen configuration |
| | | correlationID | A classifying string for the incentive |
| 6 | LocateSummary Response | | Record used to record the response from the locate system |
| | | numProductInfo Matches | |
| | | numExteriorColor Matches | |
| 7 | Meta Data | | Generic event used to store meta information about the log file itself (such as version number) |
| | | identifier | |
| | | value | |
| 8 | Page State | | Records page state transitions |
| | | state | The name of the new page state |
| 9 | Part State | | Recorded for every explicit user selection or unselection |
| | | group | |
| | | description | |
| | | state | True if the user selected the part in question, false if they unselected the part |
| 10 | Program Decision | | Records user feedback on pilot programs |
| | | accepted | True if the user opted into the program in question, false otherwise |
| 11 | Referrer | | Records the referring site |
| | | referrer | |
| | | classification | Used to group the referrers into similar groups, typical click-through or affiliate |
| 12 | Region | | Recorded each time the user enters a zipCode or other region identifier |
| | | code | Zip code or region identifier |
| | | state | U.S. State; alternatively province or country region |
| | | classification | |
| | | flow | Identifies the type of flow the user is entering (config, filter, etc.) |
| | | program | Identifies if any programs are active in the region in question |
| 13 | Session End | | Only one such event of this type is allowed per session; must be the last event in the session |
| | | reason | Gives the reason that the session ended, typically time-out |
| 14 | Session Start | | Only one such event of this type is allowed per session; must be the second event of the session (after MetaData/Version) |
| | | sourceApplication | Identifies the application that created the log file |
| | | webserver | |
| | | browser | Identifies the web browser employed by the user |
| | | remoteAddr | (depricated) Records the IP address of the user |
| 15 | User Preference | | Generic even used to record the preference of the user about a variety of things |
| | | category | |
| | | preference | |

In one embodiment, each of the data recording hooks 303, 304, 306, and 308 is written as a method call to any callable language, such as Java. The data recording hooks are capable of capturing information associated with record types and recording the captured data, as discussed in more detail below. Following are example methods, written in Java, for capturing the record types "MetaData" and "SessionStart". In one embodiment, the first method (valueBound( )) is called at the beginning of every user session. The actual data recording hooks for MetaData and SessionStart are the calls "recordMetaData" and "recordSessionStart", respectively:

```
public void valueBound( HttpSessionBindingEvent event )
{
    // Hook : Record hook version information
    RecorderWrapper.getInstance( ).recordMetaData( userContext.getContextID( ),
        ACCConstants.Value.VERSION,
        "2.6" );
    // Hook : Record SessionStart
    RecorderWrapper.getInstance( ).recordSessionStart( userContext.getContextID( ),
        "WebSiteNamev2",
        this.webServer,
        this.userAgent,
        this.remoteAddr );
}
```

The following method is called every time a part is selected by a user of a configuration Web site. The recording hook for capturing and recording the Record type Part State uses other classes in the server-side applications 302, specifically in this case the JSP tags layer 312 that support the server application layer 314 (UserContext, ModelFlowInfo, etc.) to gather the information for the Part State record type. In the code below, the data recording hook is labeled "recordPartState":

```
protected void onSelect( TWCDispatchContext dc, Part part, boolean state )
{
    UserContext ctx = UserContext.getUserContext( dc.getSession( ));
    ModelFlowInfo flowInfo = ctx.getConfigContext( ).getModelFlowInfo( );
    String displayName =
        flowInfo.getDisplayNameForPartClass(
            part.getParent( ).getPropertyString( ModelConstants.NAME ));
// Hook : Record part set (explicit selection)
    RecorderWrapper.getInstance( ).recordPartState( ctx.getContextID( ),
            displayName,
            part.getPropertyString(
ModelConstants.DESCRIPTION),
            state );
}
```

In one embodiment, every call to a data recording hook creates a record ("Record"). Records may have a standard structure such as the schema depicted below:

| Session ID | Time Signature | Sequence Number | Record Name | Record Data |
| --- | --- | --- | --- | --- |

Record Schema

A description of each element of a Record is as follows:

Session ID—An identifier, unique to each user session, that allows a collection of Records to be sorted into individual user experiences at a later time.

Time Signature—An indication of when the event represented by the Record occurred, typically accurate to the millisecond timeframe or less.

Sequence Number—A counter indicating the order of Records as written by the server application. For Records of an individual session, the sequence number is therefore guaranteed to be increasing, but not continuous.

Record Name—An identifier for the type of the Record.

Record Data—A string representation of the specific data for the Record. Interpretation of the data differs depending on the name of the Record.

Capturing and recording large amounts of session data can take an unacceptable amount of time. Thus, in one embodiment, each data recording hook is optimized to record only a small amount of session information. Information from each Record is particularly meaningful when considered with information from other Records. These relatively small Records can be stored quickly and immediately after recording in memory in a persisting buffer referred to herein as a log file. The log file can be in a file, database, or other retrievable format. Records can also be immediately stored in fast temporary memory and subsequently stored in batch directly into a database or other storage. Batch saves could occur at predetermined times, such as periodically or during anticipated slow or down times. Recording and saving quickly result in the data recording hooks having a small memory footprint on the web application server.

Figure 4:
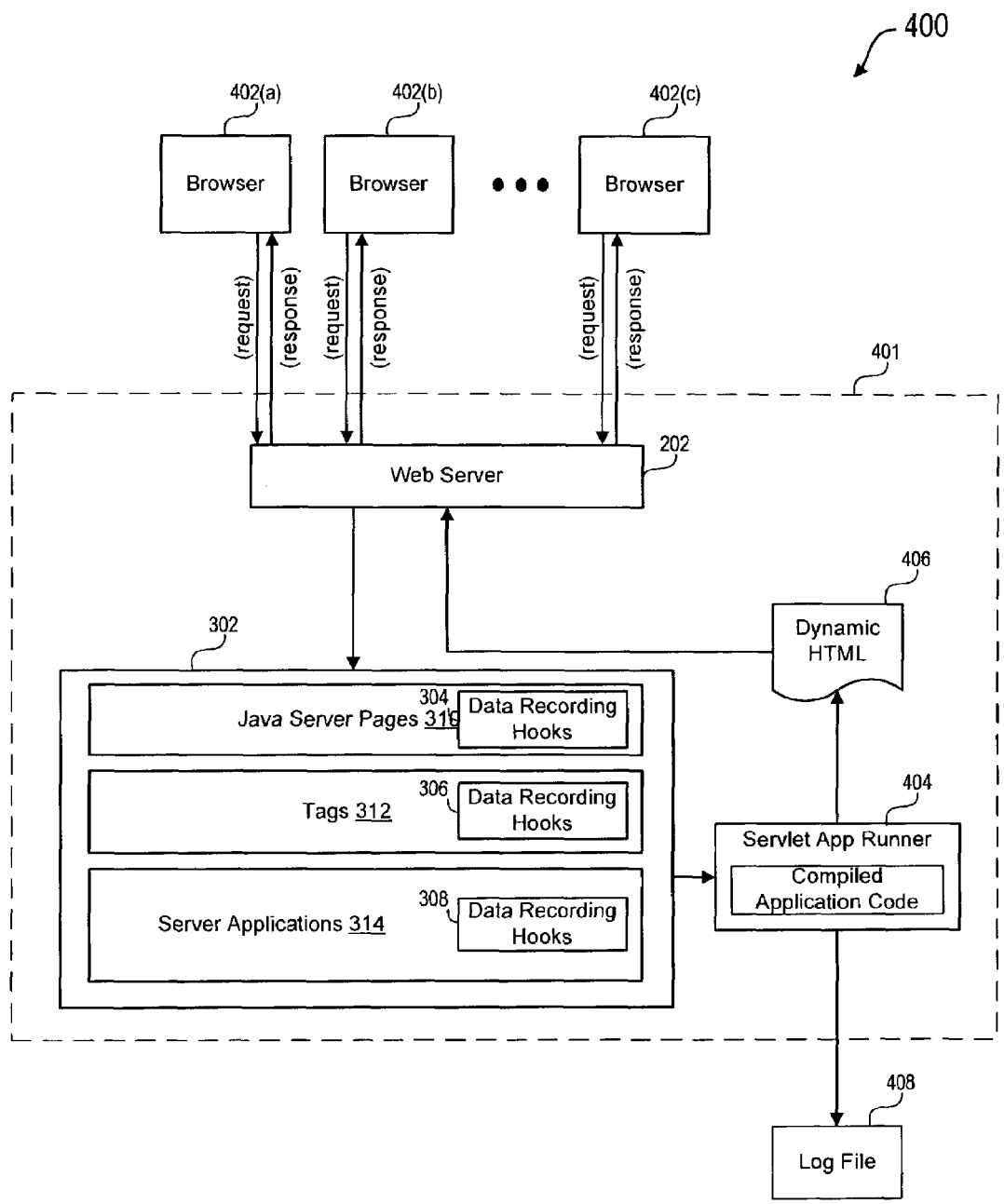
FIG. 4 depicts a Web system that includes data gathering hooks.
Figure 5:
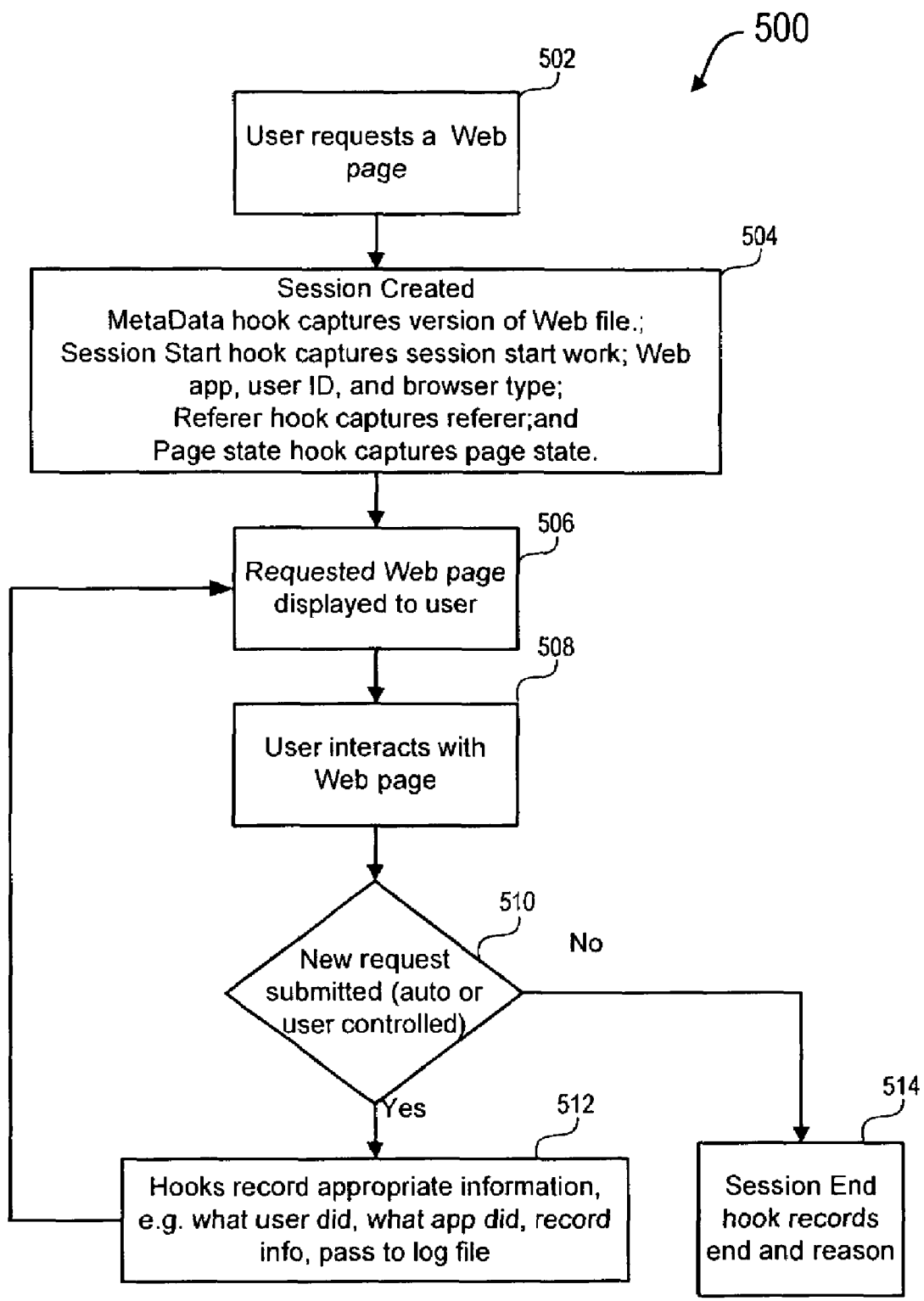
FIG. 5 depicts a user interaction and session data recording process implemented by the Web system of FIG. 4.

FIG. 4 depicts Web system 400 that includes Web application server 401, which exchanges requests and responses with browsers 402(*a*)-402(*c*). Browsers 402(*a*)-402(*c*) are identical to browsers 202(*a*)-202(*c*) except that browsers 402(*a*)-402(*c*) may contain data recording hooks, as described above. Referring to user interaction and session recording process 500 depicted in FIG. 5 and Web system 400, a user first requests a Web page in operation 502. In operation 504, when the Web server 202 receives a page request from any of browsers 402(*a*)-402(*c*), a session is created and any calls to data gathering hooks are executed. For example, a MetaData hook captures version of Web file. Session Start hook captures session start work; Web app, user ID, and browser type, Referrer hook captures referrer, and Page State hook captures page state transitions and page state name. In operation 506, the Web Server 202 provides the first requested to the user. In operation 508, the user interacts with the returned Web page.

In operation 510, if the user makes a new request for a JSP page or a request is auto submitted by the user's browser 402, server-side applications 302 respond by populating the requested JSP page from JSP layer 310 in accordance with the request. For example, in an automotive configuration web application server 401, the request may be for a JSP page that contains information on power and transmission choices for a selected vehicle. The JSP tags layer 312 and the server application layer 314, which would include a configuration engine, populate the JSP page with the appropriate configuration information for the selected vehicle. The servlet runner application 404, such as JRun, compiles the requested JSP page into application code. In operation 512, when the application code includes a data gathering hook, the data gathering hook is executed and captured information is stored as a Record in log file 408 as described above. Additionally, execution of the application code generates the dynamic HTML page 406, which Web server 202 passes to the requesting browser as a response to the browser's page request in operation 512. In operation 508, the user interacts with the requested JSP page, which may include ending the session. If the session is ended, user interaction process 500 proceeds from operation 510 to operation 514, where the Session End hook records the end of the session and a reason for ending.

Because of the small memory footprint of the data gathering hooks, any change in performance of Web application server 401 is inconsequential. Record session data into the log files at the same time that the dynamic HTML content is generated allows session information to be captured in the log files that is unavailable from other sources. As discussed in more detail below, the captured session information allows relationships to be found between the Records that would be extremely difficult to discern through other means. The relationships present a fuller, more complete history of a user's Web session than possible with conventional technology.

Figure 6:
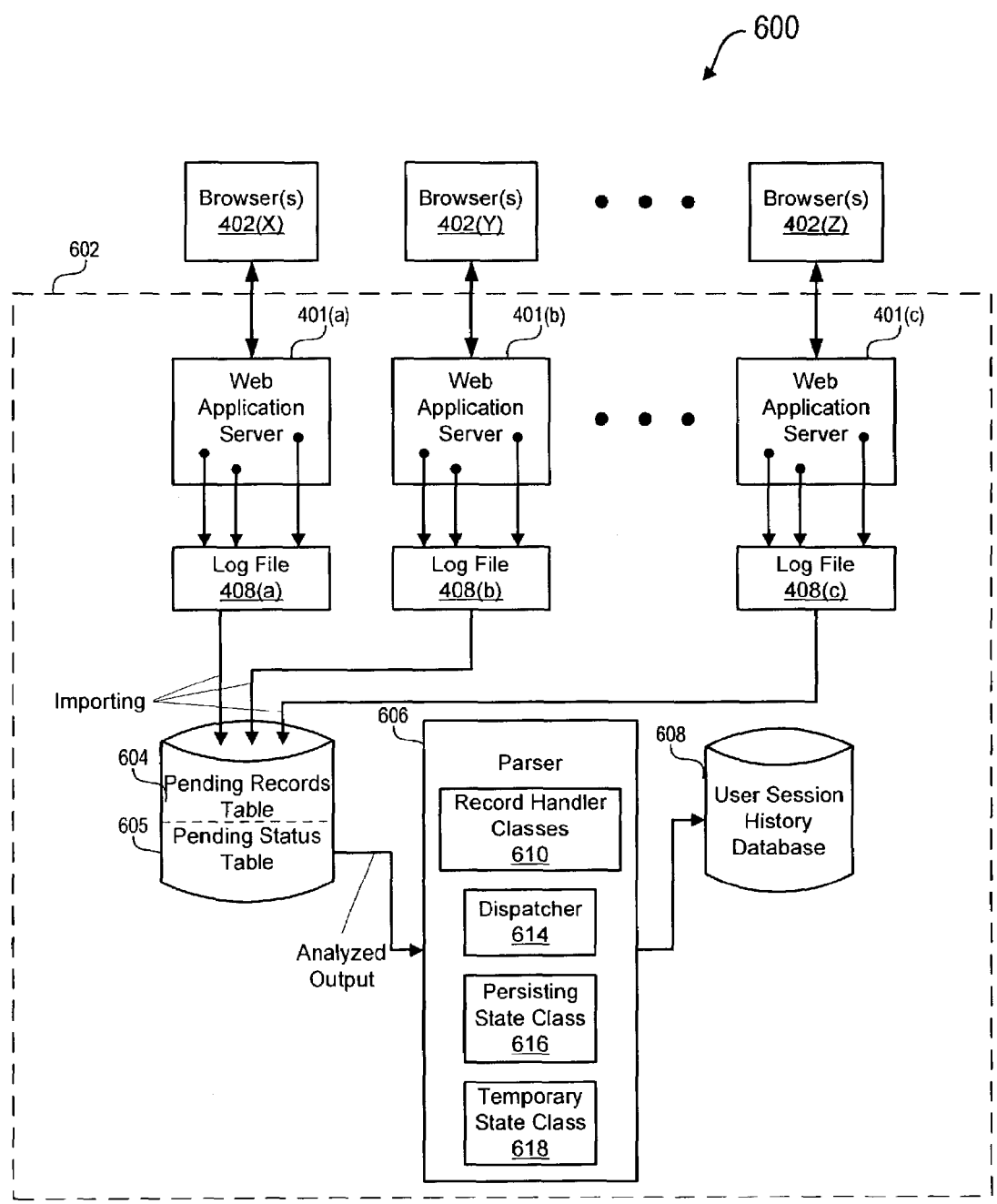
FIG. 6 depicts a Web system that includes a session recording and parsing system.

FIG. 6 depicts Web system 600 having an SRP System 602. The SRP System 602 includes any number of Web application servers 401, with each specific Web application server being denoted by a parenthetical letter. As described above each Web application server 401 writes Records to a log file 408. In one embodiment, each Web application server 401 writes Records to a separate log file, i.e. Web application server 401(a) writes to log file 408(a). In another embodiment, each Web application server 401 writes to the same log file. FIG. 6 is further described below in conjunction with the session recording and processing process 600 of FIGS. 7-10.

Capturing user session information and recording the information in Records is one part of the process of assembling a useful user session history. Another part is parsing the Records. A user may generate a large amount of information. Often, the Records should adhere to certain rules if the recorded data is complete and accurate. Additionally, interrelationships exist between many of the Records. These interrelationships can be evaluated using a set of predetermined rules. The rules not only identify the interrelationships of Records, the rules can validate Records by determining if the interrelationships are valid. For example, a product configuration Web site may have a rule requiring a zip code to be entered prior to allowing a user to configure a product. If SRP System 602 creates Records that record the product configuration history but no zip code or location Record is located, then the product configuration Records cannot be validated. Similarly, a rule may require valid configuration Records before a lead is credited with a referral. If the configuration Records cannot be validated, neither can the lead Record. Thus, in one embodiment, the accuracy and completeness of all Records for a session are suspect, and the session's Records are not parseable.

Figure 7:
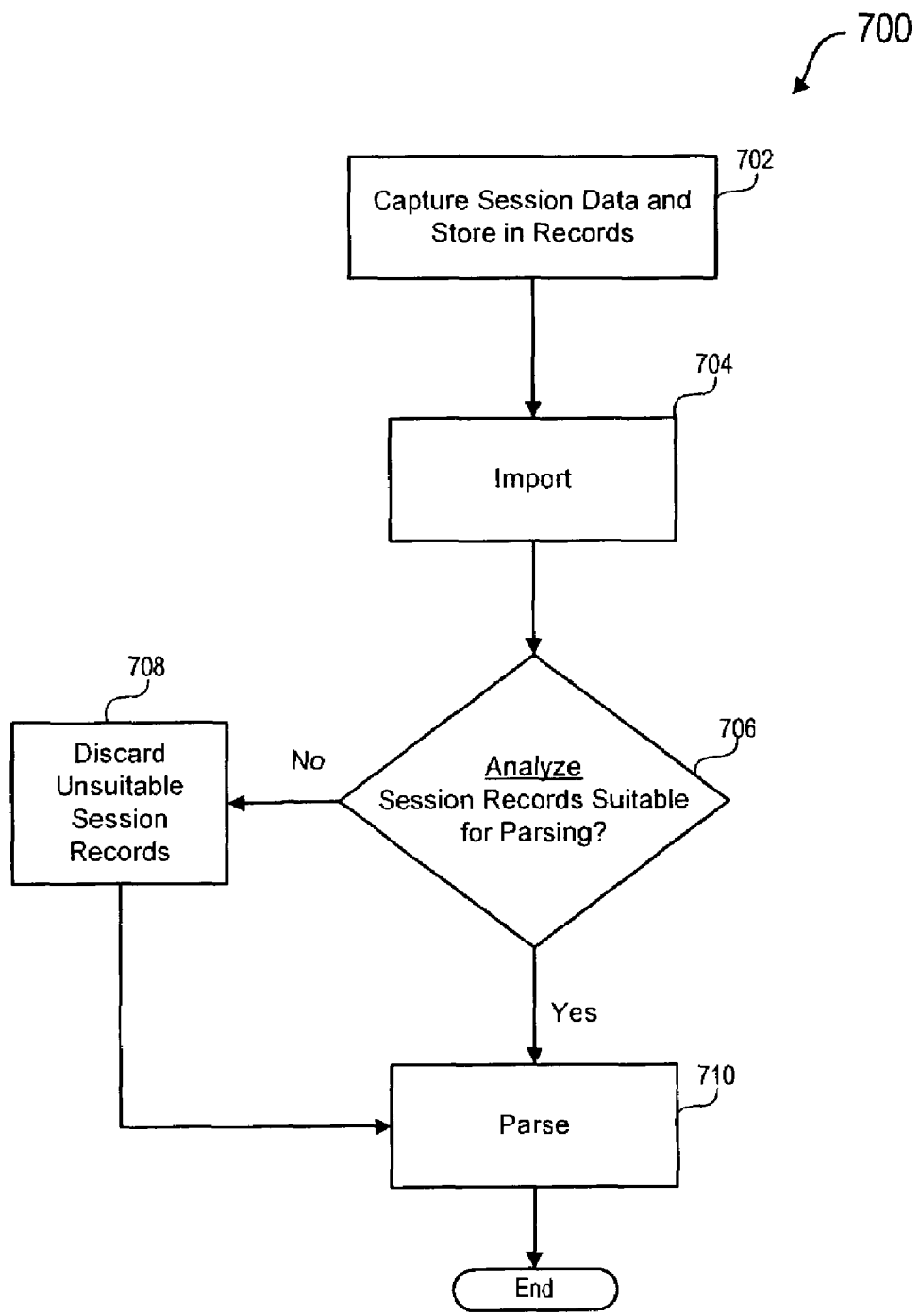
FIG. 7 depicts a high level view of session recording and parsing process.

FIG. 7 depicts a high level view of session recording and parsing process 700 ("SRP Process 700"). Lower level details of SRP Process 700 are discussed in conjunction with FIGS. 8-10. Operation 702 captures and stores a user's session data and stores it in a Record as discussed above. To re-create the historical context of the user's session, SRP Process 700, in one embodiment, operation 704 imports the Records in log files 408 to a database having a pending records table 604 and a pending status table 605. Operation 706 analyzes all of the Records contained in the log files 408, and determines if the Records are suitable for parsing. If the Records are suitable for parsing, operation 706 passes the analyzed Records to parser 606. Parser 606 includes a number of code classes. Particular classes discussed herein include record hander classes 610, dispatcher class 614, persisting state class 616, and temporary state class 618. Operation 708 discards any unsuitable Records received via operation 706. Operation 710 parses the Records by sorting the Records by a user session identifier and building up an interrelationship of the Records using a dispatcher 614 to dispatch Record names to Record handlers 610. Record handlers 610 pass information to state class(s) 612. The interrelationship of the Records is built against a set of rules. The parser 606 saves the parsed Records in the user session history database 608.

Figure 8:
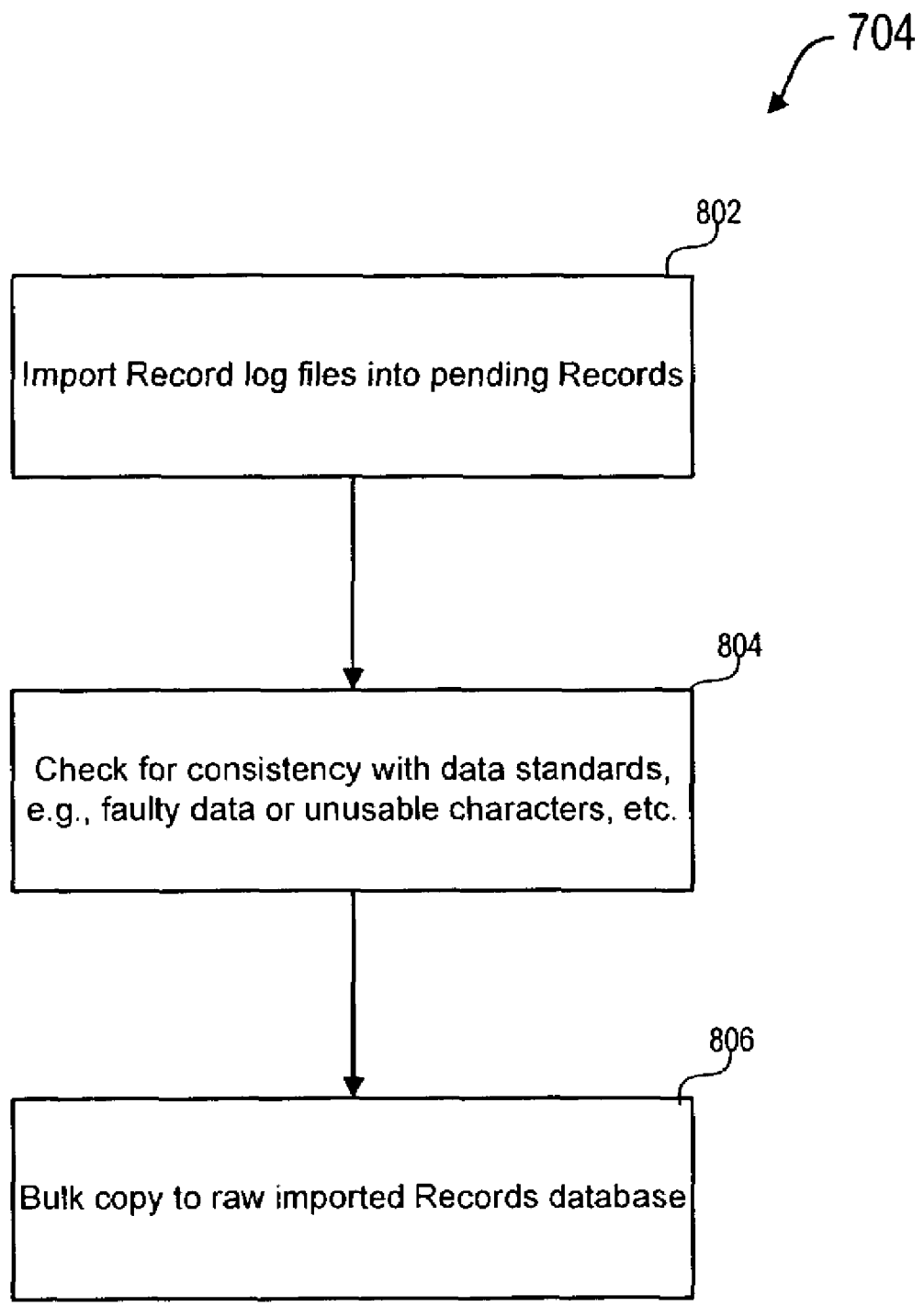
FIG. 8 depicts a more detailed import operation of the session recording and parsing process of FIG. 7.

FIG. 8 depicts a more detailed import operation 704. Operation 802 imports the log files 408 into a pending Records file. Operation 804 cleans the textual information of the log files, with structural anomalies being removed and unwanted characters stripped. Operation 806 loads the clean Records into pending records table 604. The pending records table 604 allows efficient sorting of the Records, provides a uniform data structure, and provides a reliable way to backup the records for future use.

Figure 9:
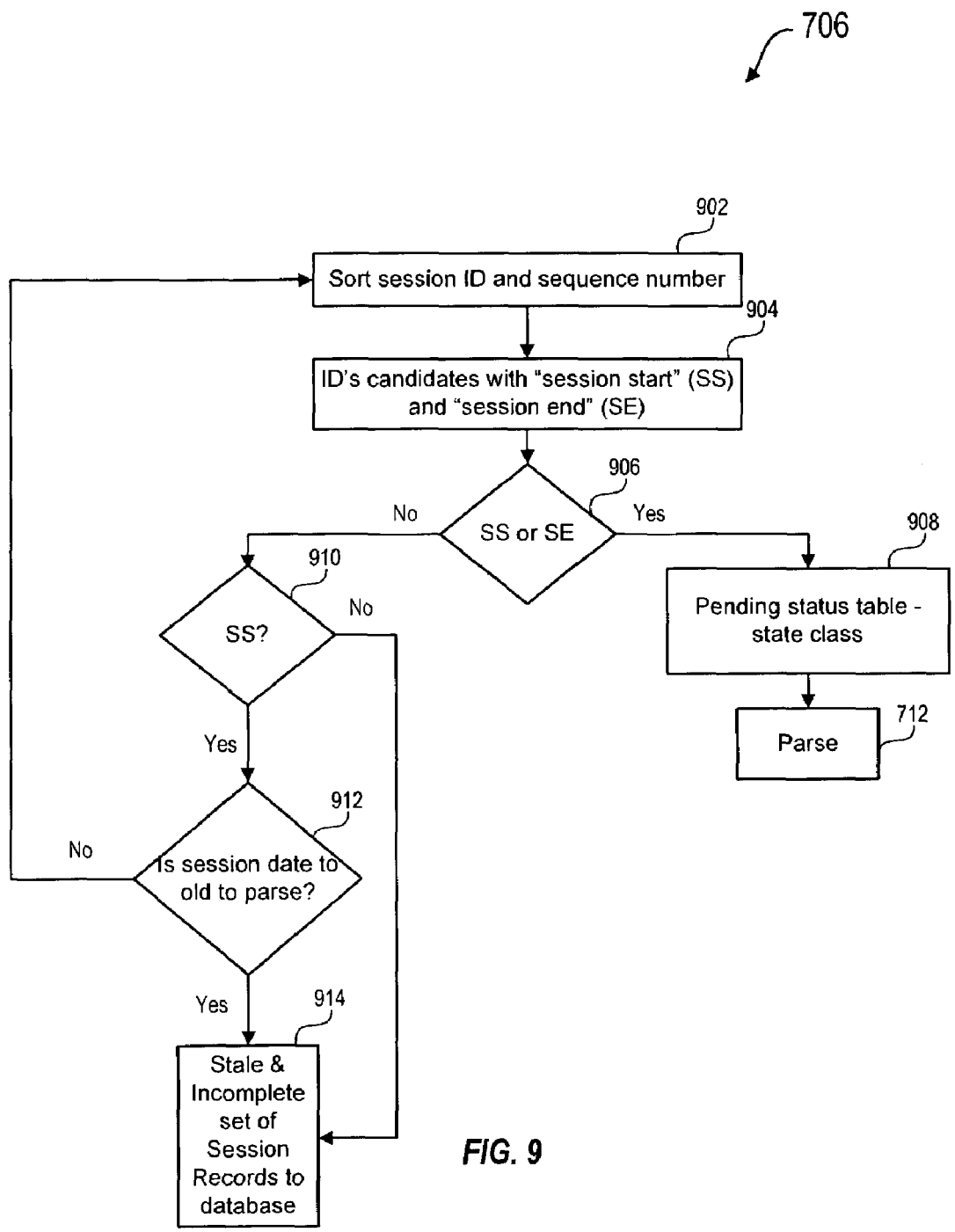
FIG. 9 depicts a more detailed analyze operation of the session recording and parsing process of FIG. 7.

FIG. 9 depicts a more detailed analyze operation 706. The analyze operation 706 involves quickly identifying Record candidates for parsing operation 710. In one embodiment, parsing operation 710 is far more computationally intensive than import operation 704 and analyze operation 706, captured sessions are eliminated that obviously cannot be parsed by parsing operation 710 before invoking the parser. Operation 902 sorts the Records in pending records table 604 by Session ID and Sequence Number. In one embodiment, a set of Records from a user session begins with a "Session Start" Record and ends with "Session End" Record. Operation 904 determines which Session IDs have both a Session Start Record and a Session End Record. Operation 906 sends each set of Records associated with a session that has both Session Start and Session End Records to a pending status table state class where they are candidates parsing operation 710. If a session does not have both Session Start and Session End Records, in one embodiment, partial sessions are cannot be parsed because no assurance exists that SRP Process 600 captured a complete history of the user's session.

In operation 910, if a session has no Session Start Record, all Records associated with the session's Session ID, operation 914 stores the incomplete session Records in a database for archival and error analysis. It is possible that import operation 704 began during a user session. Thus, no Session End Record would exist. If a session has a Session Start Record but no Session End Record, operation 912 determines if the session date is too old to parse. Determining whether a session is too old is a design choice and may be based upon the anticipated maximum duration of a Web session. If the session is not too old, the session is revisited in operation 902 during the next execution of operation 902. If the session is too old, operation 914 stores the old session Records in a database for archival and error analysis. Alternatively, Records stored in operation 914 may be discarded.

Figure 10:
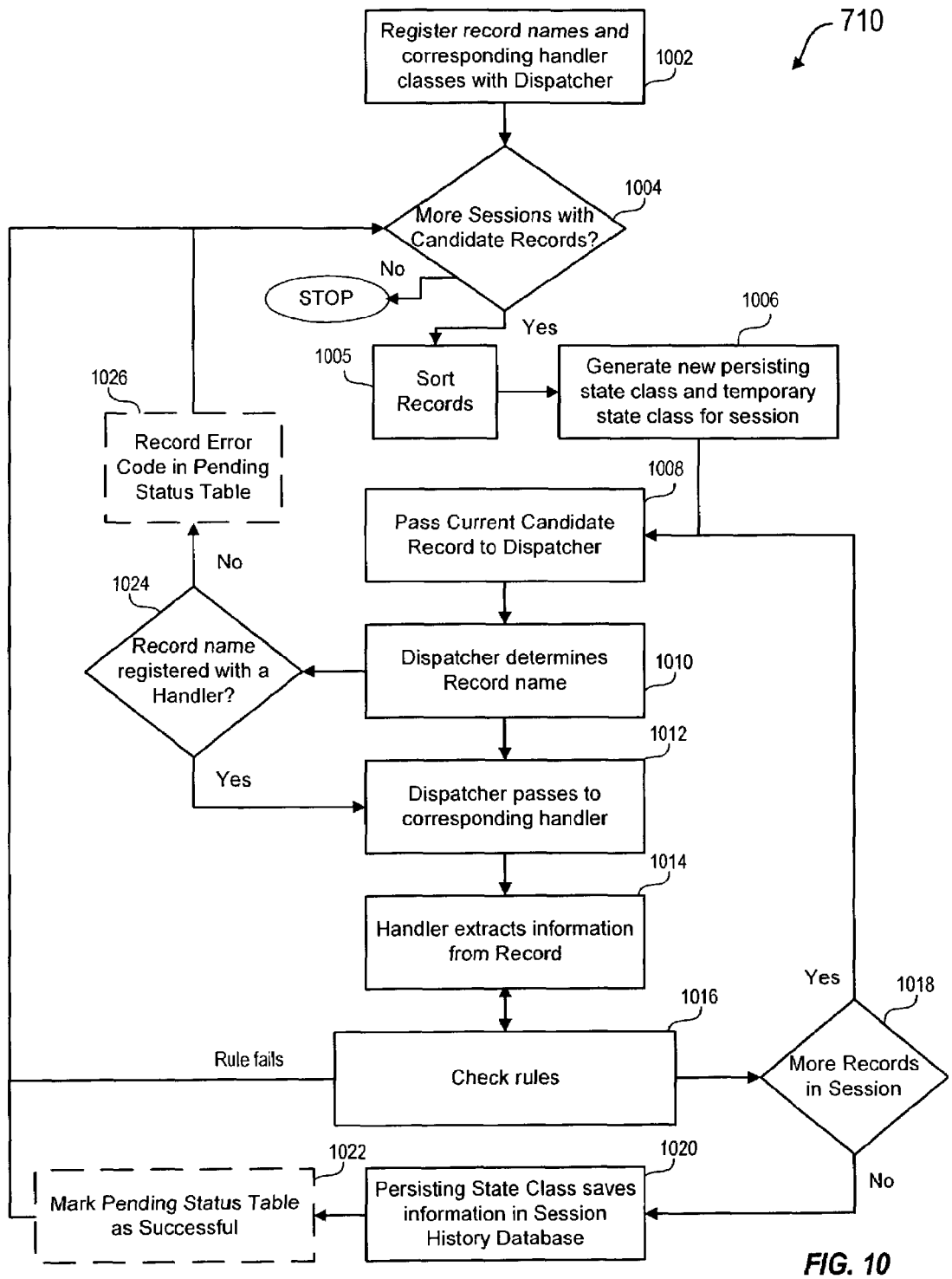
FIG. 10 depicts a more detailed parsing operation of the session recording and parsing process of FIG. 7.

FIG. 10 depicts a more detailed parsing operation 710. To re-create the contextual history of a user session, parser 606 analyzes all of the pending Records data, sorts the Records by a user Session ID, and builds up the interrelation of the Records against a known set of rules. The parser 710 keeps track of the current Record data and interrelationships of Records, with each Record modifying the state of the corresponding user session. The occurrence of macro events of the user session can be inferred by recognizing patterns of records in the session Records.

Figures 11, 12:
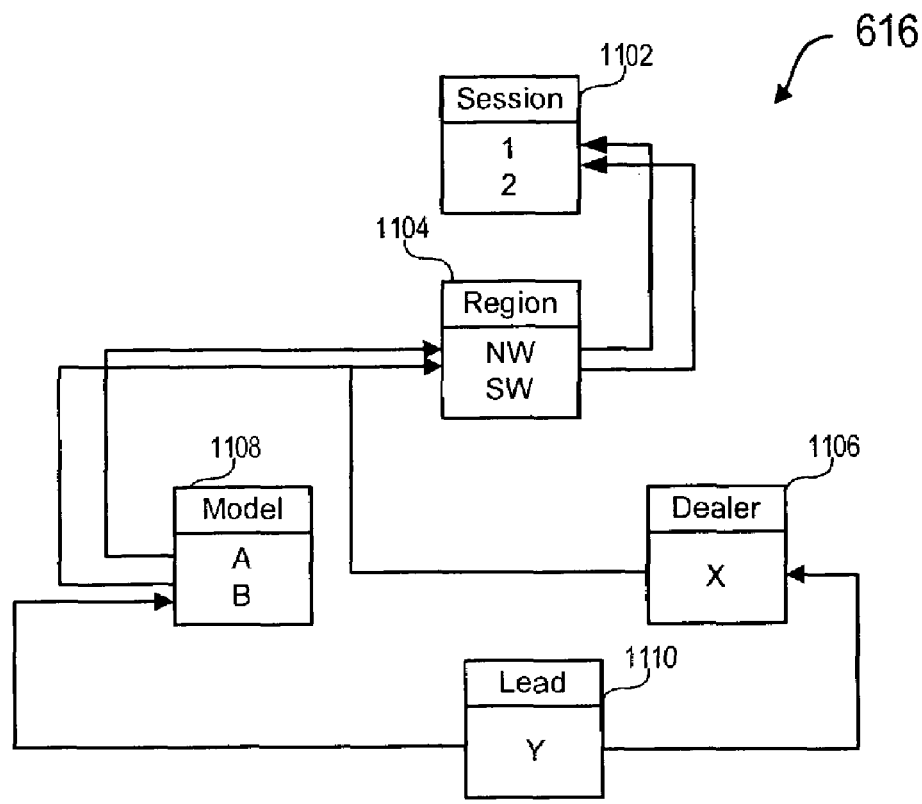
FIG. 11 depicts a pending state class of Records used by the parsing operation of FIG. 10.
FIG. 12 depicts a pending Record status table.
Figure 13:
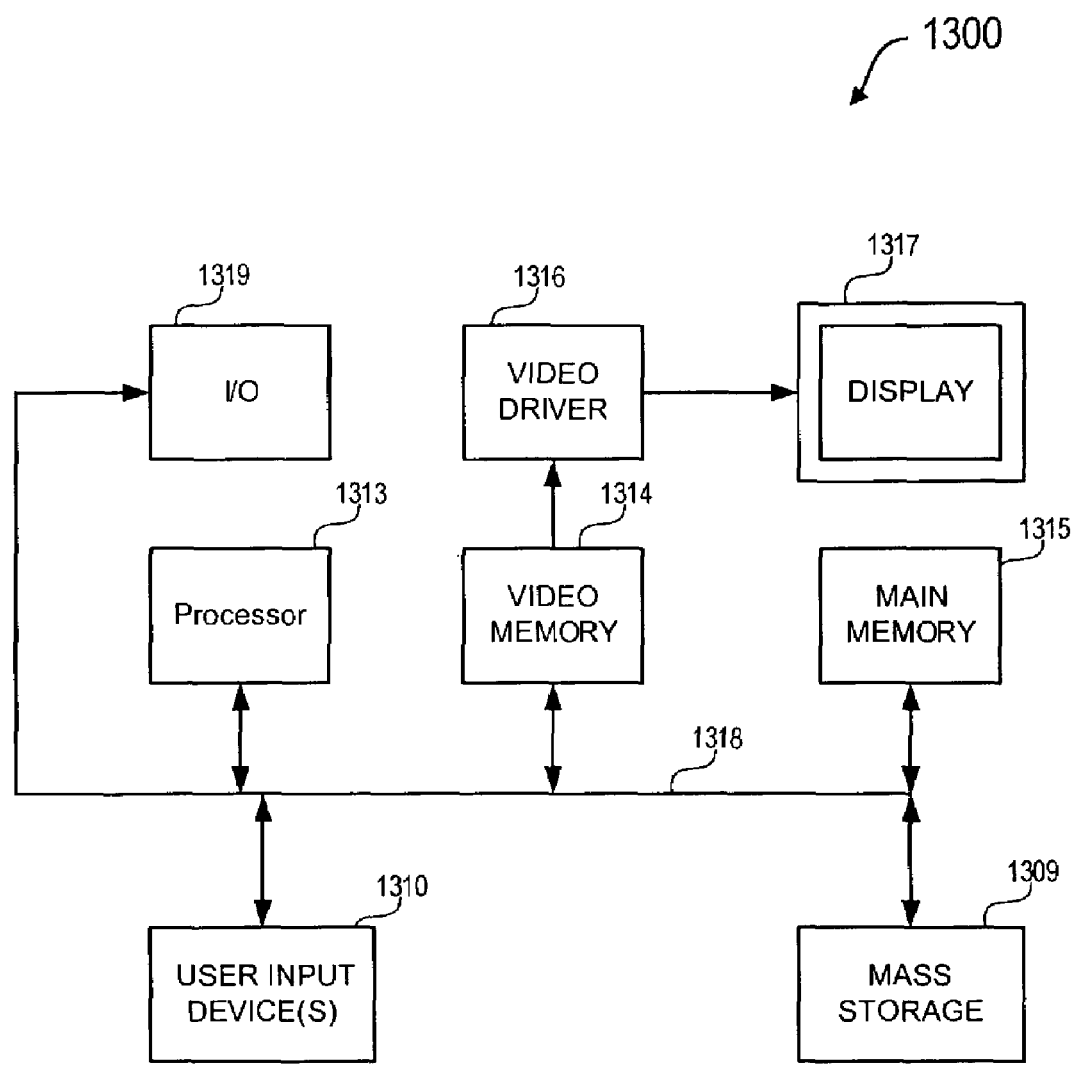
FIG. 13 depicts a computer system with which a session recording and parsing system can be implemented.

Parsing operation 702 initializes in operation 1002 by registering Record names and corresponding handler classes 610 with dispatcher 614. Note that the Record name is the fourth element of the Record Schema. For each type of Record, e.g. the fifteen (15) Record types of Table 1, a corresponding Record handler class 610 exists. The Record handler class corresponding to a specific Record type contains the code for interpreting the data in the corresponding Record. Operation 1004 examines pending status table 605 to determines if any user sessions having candidate Records are ready for parsing. Referring to FIG. 12, pending status table 605 includes a three columns: Session ID, Record Candidate Status; and Parsing Success. For every Session ID, the Record Candidate Status indicates whether a Record candidate is ready for parsing, in the process of parsing, or finished parsing.

If a session with candidate records is ready, parser 606 utilizes a reader class to load candidate Records from the pending status table 604 from the session. Operation 1005 sorts candidate Records grouped by Session ID and then sorts by sequence number in operation 1008 to efficiently create a user's session history. Operation 1006 generates persisting state class 616 and temporary state class 618 for the session. The temporary state class (not shown) includes some Records that are useful for validating rules but may not be useful for later analysis. For example, the order of Records in later analysis may be important; however, a Record may have been created prior to a Record that it depends upon. The Record is held in the temporary state class 618 until the Record it depends on is processed. The temporary state class is discarded following completion of parsing operation 710 for the session. Operation 1008 passes a Record to dispatcher 614. In operation 1010, dispatcher 614 attempts to determine the Record's name based on the initial registration. If the Record name is registered with a Record handler class, operation 1024 allows operation 1012 to pass the Record to the corresponding Record handler class of the Record handler classes 610. If the Record name is not registered with a Record handler class, an error occurs, and operation 1024 proceeds to optional operation 1026 to record an error code corresponding to a reason for the error. Parsing operation 710 then returns to operation 1004.

In operation 1014 the Record handler class corresponding to the dispatched Record extracts information from the Record based on the Record Handler's knowledge of the Record Schema. The Record handler classes 610 build up the history of the user session by taking the extracted Record information and storing selected portions in the persisting state class 616 and the temporary state class 618. Which portions are stored temporarily or more long-term is a design choice. In one embodiment, contextual information that is useful for later analysis is stored in a persisting state class 616 and information useful only in interpreting subsequent events is stored in temporary state class 618. In one embodiment, the Record handler class checks a rule library to determine if any rules have been violated, as described in more detail below. In another embodiment, the Record handler passes information extracted from the Record, and the persisting state class 616 determines if a rule has been violated. If a rule has been violated, the rule fails, and parsing operation 710 returns to operation 1004. If the rule is satisfied, operation 1018 determines whether there are more Records in the session currently being processed.

If "yes", parsing operation 710 returns to operation 1008. If no Records in the current session remain for parsing, in operation 1020, the persisting state class 616 uses a writer class to save the information stored in the persisting state class 616 in user session history database 608. Operation 1022 updates the pending status table 605 to indicate that the current session has been parsed. Parsing operation 710 then returns to operation 1004. If there are no more sessions with candidate records, parsing operation 710 stops. Note, parsing operation 710 can be run at any time.

FIG. 11 depicts one embodiment of a persisting state class 616. The persisting state class 616 includes a series of fact tables 1102, 1104, 1106, 1108, and 1110 that form a relational database. The data in the fact tables is extracted from session Records by the corresponding handler class. The data schema of persisting state class 616 is a matter of design choice and may be optimized for the analysis of sessions of any particular Web site. Rules evaluated in operation 1016 are in one embodiment related to the organization of persisting state class 616. The interrelationships shown in the fact tables demonstrate interrelationships between information in Records and also indicate rules. For example, the set of session Records are invalid if they are not interrelated to a Session ID. A Model selection is invalid if a region has not been identified. A lead is invalid if a dealer and a model have not been identified, and so forth. Additionally, the Record handler class stores information in the fact tables sequentially, thus allowing the session history to accurately reflect the latest session information. Also, rules can relate to the order of information. For example, in a website with regional pricing, the user must choose a zip code before selecting a configuration so that accurate pricing can be displayed. Therefore, if an ActiveConfiguration record is encountered before any Region record has been seen, the session is deemed invalid.

Table 2 and Table 3 depict two examples of completed user session history as stored in the user session history database 608. The examples in Table 2 and Table 3 illustrate the ability of SRP System 602 and SRP Process 700 to develop a rich user session history that records interactions with the user and data determined by server-side processing.

TABLE 2

Sample Session 1 Records

| SessionID | TimeSignature | SeqNum | Name | Data |
|---|---|---|---|---|
| 1 | 1025152625659 | 3842628 | MetaData | Version:2.6 |
| 1 | 1025152625659 | 3842629 | SessionStart | WebApp:127.0.0.1:Mozilla |
| 1 | 1025152625659 | 3842630 | Referrer | SomeOtherWebSite:ClickThrough |
| 1 | 1025152625659 | 3842631 | PageState | Site Entry |
| 1 | 1025153907276 | 3847081 | SessionEnd | Timeout |

TABLE 3

Sample Session 2 Records

| SessionID | TimeSignature | SeqNum | Name | Data |
|---|---|---|---|---|
| 2 | 1025164026696 | 3856314 | MetaData | Version:2.6 |
| 2 | 1025164026696 | 3856315 | SessionStart | WebApp:127.0.0.1:Mozilla |
| 2 | 1025164026696 | 3856316 | Referrer | SomeOtherWebSite:ClickThrough |
| 2 | 1025164026696 | 3856317 | PageState | Site Entry |
| 2 | 1025164054367 | 3856326 | UserPreference | Model:SportsCar |
| 2 | 1025164054367 | 3856327 | Region | 00000:TX:Austin:Southwest |
| 2 | 1025164054367 | 3856328 | PageState | Pick Path |
| 2 | 1025164060945 | 3856329 | PageState | PreTrimSelect |
| 2 | 1025164069586 | 3856330 | UserPreference | BodyStyle:Convertible |
| 2 | 1025164069586 | 3856331 | UserPreference | ModelGroup:Turbo |
| 2 | 1025164069586 | 3856332 | PageState | TrimSelect |
| 2 | 1025164124320 | 3856334 | Configuration | 2002:OEM:SportsCar:TurboDeluxe |
| 2 | 1025164124320 | 3856335 | PageState | Exterior Color & Interior Trim |
| 2 | 1025164139929 | 3856336 | PartState | Exterior:Black Clearcoat:true |
| 2 | 1025164139929 | 3856337 | PageState | Exterior Color & Interior Trim |
| 2 | 1025164158757 | 3856339 | PartState | Interior Color:Dark Charcoal:true |
| 2 | 1025164158757 | 3856340 | PageState | Exterior Color & Interior Trim |
| 2 | 1025164168179 | 3856341 | PageState | Options |
| 2 | 1025164178445 | 3856342 | PartState | Audio:SuperStereo:true |
| 2 | 1025164178445 | 3856343 | PageState | Options |
| 2 | 1025164182148 | 3856344 | PageState | LocateDealer |
| 2 | 1025165427202 | 3856980 | ConfigurationDetail | Interior Color:Dark Charcoal |
| 2 | 1025165427202 | 3856981 | ConfigurationDetail | Exterior Paint:Black Clearcoat |
| 2 | 1025165427202 | 3856982 | ConfigurationDetail | Audio:SuperStereo |
| 2 | 1025165427202 | 3856983 | ConfigurationDetail | Roof Color:Black Roof |
| 2 | 1025165427202 | 3856984 | SessionEnd | Timeout |

Embodiments of the SRP System 602 and SRP Process 700 can be implemented on a computer system such as a general-purpose computer 1400 illustrated in FIG. 14. Input user device(s) 1410, such as a keyboard and/or mouse, are coupled to a bi-directional system bus 1418. The input user device(s) 1410 are for introducing user input to the computer system and communicating that user input to processor 1413. The computer system of FIG. 14 also includes a video memory 1414, main memory 1415 and mass storage 1409, all coupled to bi-directional system bus 1418 along with input user device(s) 1410 and processor 1413. The mass storage 1409 may include both fixed and removable media, such as other available mass storage technology. Bus 1418 may contain, for example, 32 address lines for addressing video memory 1414 or main memory 1415. The system bus 1418 also includes, for example, an n-bit DATA bus for transferring DATA between and among the components, such as CPU 1409, main memory 1415, video memory 1414 and mass storage 1409, where "n" is, for example, 32 or 64. Alternatively, multiplex DATA/address lines may be used instead of separate DATA and address lines.

I/O device(s) 1419 may provide connections to peripheral devices, such as a printer, and may also provide a direct connection to a remote server computer systems via a telephone link or to the Internet via an internet service provider (ISP). I/O device(s) 1419 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 1409 until loaded into main memory 1415 for execution. Computer programs may also be in the form of electronic signals modulated in accordance with the computer program and data communication technology when transferred via a network. The method and functions relating to SRP System 602 and SRP Process 700 may be implemented in a computer program alone or in conjunction with hardware.

The processor 1413, in one embodiment, is a 32-bit or 64-bit microprocessor manufactured by Motorola, such as the 680X0 processor or microprocessor manufactured by Intel, such as the 80X86, or Pentium processor, or IBM. However, any other suitable single or multiple microprocessors or microcomputers may be utilized. Main memory 1415 is comprised of dynamic random access memory (DRAM). Video memory 1414 is a dual-ported video random access memory. One port of the video memory 1414 is coupled to video amplifier 1416. The video amplifier 1416 is used to drive the display 1417. Video amplifier 1416 is well known in the art and may be implemented by any suitable means. This circuitry converts pixel DATA stored in video memory 1414 to a raster signal suitable for use by display 1417. Display 1417 is a type of monitor suitable for displaying graphic images.

The computer system described above is for purposes of example only. The SRP System 602 and SRP Process 700 may be implemented in any type of computer system or programming or processing environment.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims. For example, it will be apparent to those of ordinary skill in the art that other Web systems and associated software components may be used to implement the SRP System.

What is claimed is:

1. A method of recording and parsing a network user session, the method comprising:
   receiving one or more requests from a client-side application for data during the network user session;
   processing each request using one or more server-side applications, wherein processing each request includes generating a response to each request;
   capturing session information included in each request;
   capturing session information generated during the processing of each request by each of the server-side applications, wherein the session information generated during the processing of each request includes information derived from content included in the response to each request;
   generating a set of records from the session information for the network user session, wherein the records include information derived from the content included in the response to each request;
   responding to each of the requests; and
   parsing the set of records to generate a history of the network user session, wherein the history includes the information derived from the content included in the response to each request and parsing the set of records to generate a history of the network user session comprises:
     analyzing the captured session information; and
     recreating a history of the network user session.

2. The method of claim 1 wherein parsing the set of records further comprises:
   determining if the history of the network user session represents a complete network user session; and
   determining if the history of the network session adheres to a predetermined set of record interrelationship rules.

3. The method of claim 2 wherein parsing the set of records further comprises:
   determining interrelationships between at least a subset of the set of records;
   evaluating the interrelationships using the set of record interrelationship rules; and
   validating records having valid interrelationships.

4. The method of claim 1 wherein the one or more server-side applications comprise a Web server application, a dynamic content Web page generation application, and a session recording and parsing system.

5. The method of claim 1 wherein generating a set of records from the session information for the network user session comprises:
   labeling predetermined types of data with respective labels; and
   associating each of the respective labels with a type of record.

6. The method of claim 5 wherein the record is a member of the group comprising: a web session start record and a web session end record.

7. The method of claim 5 wherein the server-side application comprises a product configuration application and the record is a member of the group comprising: a web session start record, a web session end record, an active configuration record, a configuration detail record, a part state record, and a referrer record.

8. The method of claim 5 wherein each record has a data structure comprising a web session ID, a time signature, a sequence number, a record name, and record data.

9. The method of claim 5 further comprising:
   associating at least one of the respective labels with a sub-record type.

10. The method of claim 1 wherein at least one server-side application comprises a configuration application.

11. The method of claim 1 wherein:
    processing each request using one or more server-side applications comprises:
      generating a dynamic web page; and
    capturing session information generated during the processing of each request by each of the server-side applications comprises:
      recording information included in the dynamic web page.

12. The method of claim 1 wherein the client-side application comprises a web browser and data recording code, wherein receiving one or more requests from a client-side application for data during the network user session further comprises:
    receiving one or more requests from the web browser that include Web session related data collected by the data recording code.

13. The method of claim 12 wherein the Web session related data collected by the data recording code includes at least one member of the group comprising a Web file version, Web browser type, user identification, user interaction with the client-side application information, session start information, page state transitions, and web page referrer information.

14. The method of claim 12 wherein the client-side application comprises a web page generation layer, a tag layer, and a server application layer, the method further comprising:
    capturing the Web session related data from the web page generation layer, the tag layer, and the server application layer.

15. A computer program storage medium comprises instructions executable by an information handling system, the instructions for:
    receiving one or more requests from a client-side application for data during a network user session;

processing each request using one or more server-side applications, wherein processing each request includes generating a response to each request;

capturing session information included in each request;

capturing session information generated during the processing of each request by each of the server-side applications, wherein the session information generated during the processing of each request includes information derived from content included in the response to each request;

generating a set of records from the session information for the network user session, wherein the records include information derived from the content included in the response to each request;

responding to each of the requests; and parsing the set of records to generate a history of the network user session, wherein the history includes the information derived from the content included in the response to each request and wherein the instructions for parsing the set of records to generate a history of the network user session are further configured for:

analyzing the captured session information; and recreating a history of the network user session.

16. The computer program storage medium of claim 15 wherein a Web session related data collected by the data recording code includes at least one member of the group comprising a Web file version, Web browser type, user identification, user interaction with the client-side application information, session start information, page state transitions, and web page referrer information.

17. The computer program storage medium of claim 15 wherein the client-side application comprises a web page generation layer, a tag layer, and a server application layer, the computer program product further comprising instructions executable by the information handling system for:

capturing a Web session related data from the web page generation layer, the tag layer, and the server application layer.

18. The computer program storage medium of claim 15 wherein the instructions for parsing the set of records are further configured for:

determining if the history of the network user session represents a complete network user session; and determining if the history of the network session adheres to a predetermined set of record interrelationship rules.

19. The computer program storage medium of claim 18 wherein the instructions for parsing the set of records are further configured for:

determining interrelationships between at least a subset of the set of records;

evaluating the interrelationships using the set of record interrelationship rules; and validating records having valid interrelationships.

20. The computer program storage medium of claim 15 wherein the one or more server-side applications comprise a Web server application, a dynamic content Web page generation application, and a session recording and parsing system.

21. The computer program storage medium of claim 15 wherein the instructions for generating a set of records from the session information for the network user session are further configured for:

labeling predetermined types of data with respective labels; and associating each of the respective labels with a type of record.

22. The computer program storage medium of claim 21 wherein the record is a member of the group comprising: a web session start record and a web session end record.

23. The computer program storage medium of claim 21 wherein the server-side application comprises a product configuration application and the record is a member of the group comprising: a web session start record, a web session end record, an active configuration record, a configuration detail record, a part state record, and a referrer record.

24. The computer program storage medium of claim 21 wherein each record has a data structure comprising a web session ID, a time signature, a sequence number, a record name, and record data.

25. The computer program storage medium of claim 21 further comprising instructions executable by the information handling system for:

associating at least one of the respective labels with a sub-record type.

26. The computer program storage medium of claim 15 wherein at least one server-side application comprises a configuration application.

27. The computer program storage medium of claim 15 wherein:

the instructions for processing each request using one or more server-side applications are further configured for:

generating a dynamic web page; and the instructions for capturing session information generated during the processing of each request by each of the server-side applications are further configured for:

recording information included in the dynamic web page.

28. The computer program storage medium of claim 15 wherein the client-side application comprises a web browser and data recording code, wherein the instructions for receiving one or more requests from a client-side application for data during the network user session further are further configured for:

receiving one or more requests from the web browser that include Web session related data collected by the data recording code.

29. An apparatus comprising:

a system to receive one or more requests from a client-side user application during a network user session, to capture session information included in each request, and to process each request using one or more server-side applications, wherein processing each request includes generating a response to each request;

one or more network session information capturing modules to capture session information generated during the processing of each request by the one or more server-side applications, wherein the session information generated during the processing of each request includes information derived from content included in the response to each request;

one or more modules to generate a set of records from the session information for the network user session, wherein the records include information derived from the content included in the response to each request; and parsing modules to generate a contextual history of the network user session, wherein the history includes the information derived from the content included in the response to each request and wherein the parsing modules are further configured to:

analyze the captured session information; and recreate a history of the network user session.

30. The apparatus of claim 29 wherein the parsing modules are further configured to:
   determine if the history of the network user session represents a complete network user session; and
   determine if the history of the network session adheres to a predetermined set of record interrelationship rules.

31. The apparatus of claim 30 wherein the parsing modules are further configured to:
   determine interrelationships between at least a subset of the set of records;
   evaluate the interrelationships using the set of record interrelationship rules; and
   validate records having valid interrelationships.

32. The apparatus of claim 29 wherein at least one server-side application comprises a configuration application.

33. The apparatus of claim 29 wherein the server-side generated information includes a web page, the apparatus further comprising:
   a dynamic web page generator to generate the web page, wherein the web page includes the content; and
   and the network session information gathering modules are further configured to:
      record at least a subset of the content included in the dynamic web page.

34. The apparatus of claim 29 wherein the one or more server-side applications comprise a Web server application, a dynamic content Web page generation application, and a session recording and parsing system.

35. The apparatus of claim 29 wherein the parsing modules are further configured to:
   label predetermined types of data with respective labels; and
   associate each of the respective labels with a type of record.

36. The apparatus of claim 35 wherein the record is a member of the group comprising: a web session start record and a web session end record.

37. The apparatus of claim 35 wherein the server-side application comprises a product configuration application and the record is a member of the group comprising: a web session start record, a web session end record, an active configuration record, a configuration detail record, a part state record, and a referrer record.

38. The apparatus of claim 35 wherein each record has a data structure comprising a web session ID, a time signature, a sequence number, a record name, and record data.

39. The apparatus of claim 35 wherein the parsing modules are further configured to:
   associate at least one of the respective labels with a sub-record type.

40. The apparatus of claim 29 wherein the user interactions comprise one or more requests from a client-side web browser that include Web session related data collected by data recording code the client-side application.

41. The apparatus of claim 40 wherein the Web session related data collected by the data recording code includes at least one member of the group comprising a Web file version, Web browser type, user identification, user interaction with the client-side application information, session start information, page state transitions, and web page referrer information.

42. The apparatus of claim 40 wherein the client-side application comprises a web page generation layer, a tag layer, and a server application layer, and the network session information gathering modules are further configured to:
   capture the Web session related data from the web page generation layer, the tag layer, and the server application layer.

43. A method of recording and parsing network user sessions, the method comprising:
   receiving one or more requests from multiple client-side application for data during the network user sessions;
   processing each request using one or more server-side applications, wherein processing each request includes generating a response to each request;
   capturing session information included in each request;
   capturing session information generated during the processing of each request by each of the server-side applications, wherein the session information includes information derived from content included in the response to each request;
   generating records from the session information for each of the network user sessions, wherein the records include information derived from the content included in the response to each request;
   importing record into a log file;
   analyzing all the records contained in each log file;
   determining which of the records are suitable for parsing; and
   for each record suitable for parsing, parsing the records to generate a history of each network user session associated with a record suitable for parsing, wherein the history includes the information derived from the content included in the response to each request and parsing the records to generate a history of each network user session comprises:
      analyzing the captured session information; and
      recreating a history of the network user session.

44. The method of claim 43 further comprising:
   discarding each record that is unsuitable for parsing.

45. The method of claim 43 wherein parsing the records comprises:
   sorting each of the records by a user session identifier; and
   building an interrelationship of each record in accordance with a set of rules.

* * * * *